Nov. 20, 1934.   A. BUCKNALL   1,981,306
PIT CAGE AND THE LIKE
Filed Jan. 22, 1934   2 Sheets-Sheet 2
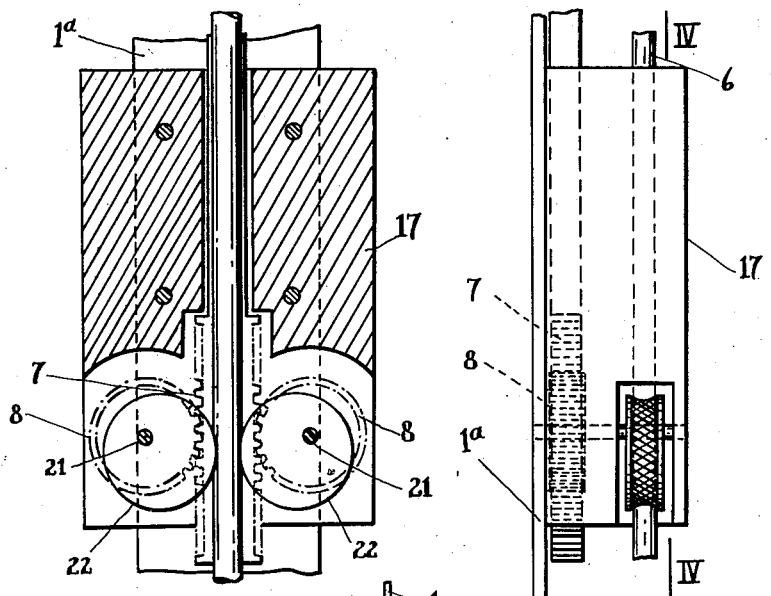
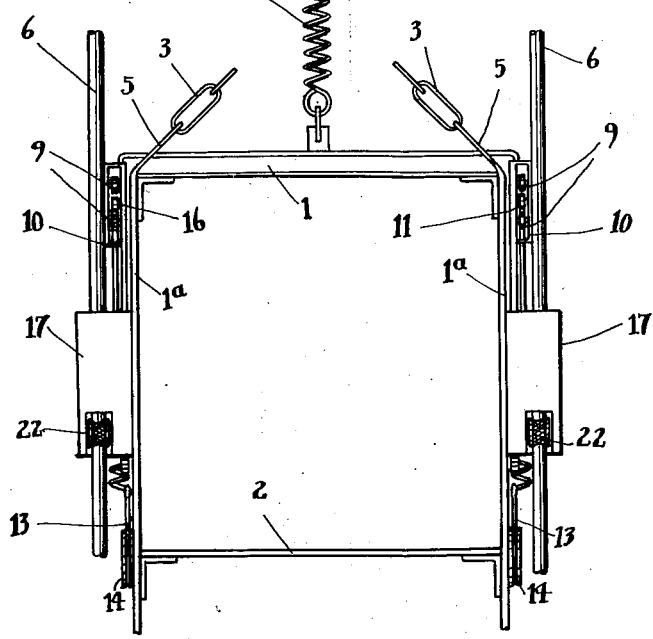
INVENTOR
ALFRED BUCKNALL
By Chatwin & Company Attys.

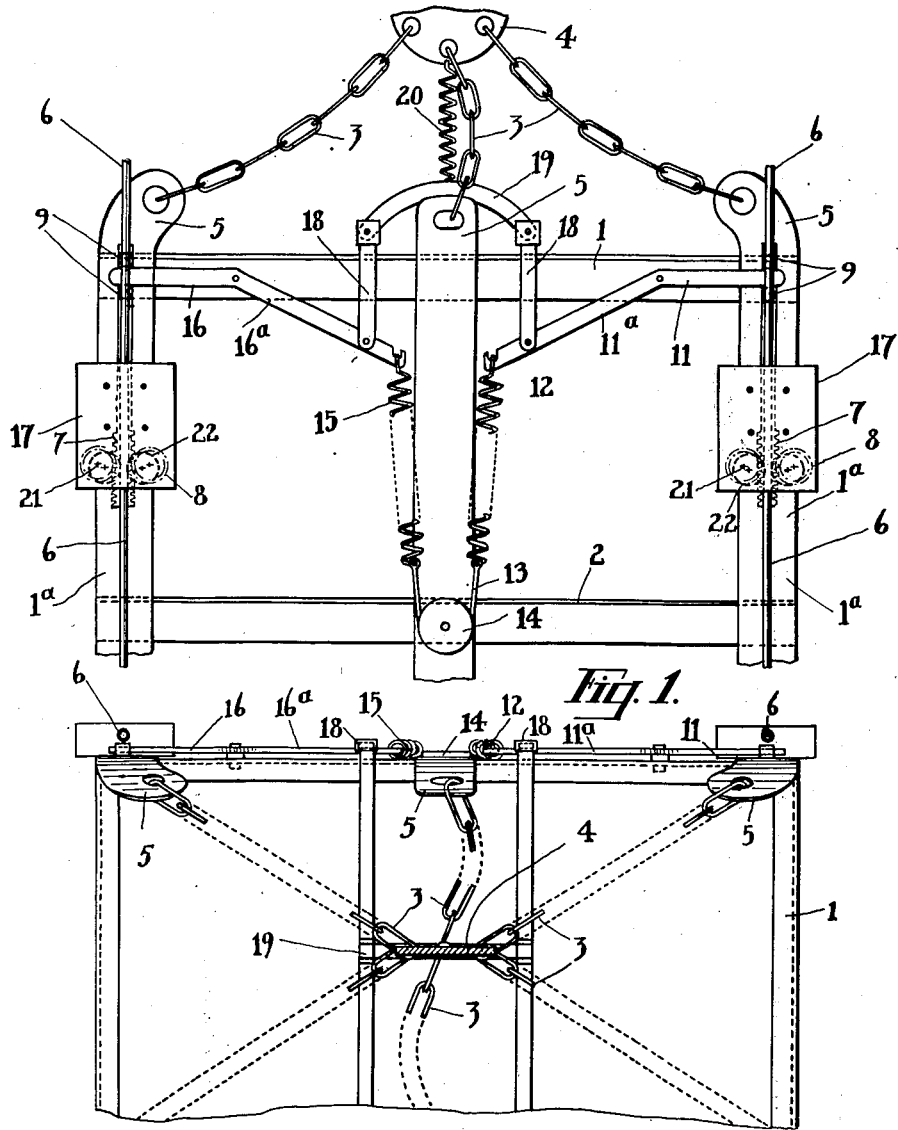

Patented Nov. 20, 1934

1,981,306

UNITED STATES PATENT OFFICE 1,981,306

PIT CAGE AND THE LIKE

Alfred Bucknall, Swanley, England

Application January 22, 1934, Serial No. 707,841. In Great Britain February 2, 1933

2 Claims. (Cl. 187—87)

The invention relates to pit cages and the like and has for its object to provide reliable and automatic and practically instantaneous mechanism for stopping the descent of the cage upon the breaking of the hauling rope or cable, and also for avoiding all strain on said stopping mechanism.

According to the invention apparatus for stopping the descent of a pit cage or the like on the breaking of the hauling rope or cable is provided which comprises rollers or the like eccentrically mounted in such manner as to grip the usual guide ropes and rack mechanism for rotating said rollers or the like said rack mechanisms being actuated when the haulage rope breaks by pivotal members connected through a compensating device with the hauling rope or cable.

In order that the invention may be clearly understood I will now describe the same with reference to the accompanying drawings in which:

Fig. 1 is a side elevation of the top part of a pit cage constructed according to the present invention.

Fig. 2 is a plan of Fig. 1 part of the cage being broken away.

Fig. 3 is an end elevation of Fig. 1.

Fig. 4 is a sectional elevation of the gripping mechanism drawn to an enlarged scale and shown in its gripping or locking position the section being taken on the line IV—IV of Fig. 5 and Fig. 5 is a side elevation thereof.

Referring to the drawings 1 represents the framework of the pit cage, 2 represents the second deck thereof, 3 represent the supporting chains which are connected at their upper ends to a butterfly 4 to which the lower end of the hauling rope or cable (not shown) is connected, the other or lower ends being connected to lugs 5 carried by the frame members 1 of the cage all said parts being of the usual or well known construction.

6 represents the usual guide ropes which are located one in close proximity to each of the four corner members, pillars or posts 1a of the cage which latter is mounted thereon and guided thereby in its vertical movements.

Upon each of the members 1a approximately midway between the top thereof and the second deck 2 is mounted a rack mechanism comprising a rack member 7 toothed along both its edges and adapted to engage or mesh with gear or rack wheels 8 located on either side thereof as shown more particularly in Figure 4.

The rack members 7 are at their upper extremities formed or shaped in such manner as to receive or accommodate a pair of rollers 9 or the like, that is to say said rollers are rotatably mounted on the rack member the outer ends of the spindles thereof being supported by a strap 10 and between said rollers 9 is adapted to slide one arm of a two armed or bell crank lever 11; or the rollers 9, or the like, might be dispensed with, the arm of said lever 11 might be arranged to slide in the forked or bent over end of the rack member 7 in any suitable and known manner.

The lever 11 is pivotally mounted upon the top cross member 1 of the frame of the cage, as shown, and the other arm 11a of said bell crank lever 11 is advantageously downwardly bent, as shown in Fig. 1 and at its end connected to one end of a tension spring 12 the other end of which is connected to one end of a wire, chain or other flexible member 13 which is passed under or around a wheel, roller or the like 14 and the other end of which member 13 is connected to one end of a spring 15 the other end of which is connected to the downwardly bent arm of a like bell crank lever 16, mounted in a similar manner to the bell crank lever 11 and arranged upon the other side of the cage and the other arm of said bell crank lever 16 engages a rack mechanism similar to that hereinbefore described. In this manner a compensating device between each rack mechanism on either side of the cage is provided.

Each rack mechanism is mounted in a block or housing 17 which is suitably recessed for the purpose and the rack members and guide ropes 6 pass through holes in said housing 17 as shown. Or the block member or housing might be substituted by a frame member as will be readily understood.

Preferably there are arranged a pair of rack mechanisms and a housing 17 on each side of the cage, that is to say, one rack mechanism for each guide rope 6 and the pair of rack mechanisms on one side of the cage is connected to the pair on the opposite side thereof in the following manner:—

At a suitable point on each of the downwardly bent arms 11a and 16a of the bell crank levers on one side of the cage is pivoted a rod bar or the like 18 which passes over the top of the cage to connect with the corresponding arms of the bell crank levers on the other side thereof, the two rods, bars or the like 18 being interconnected at the top of the cage by a cross bar preferably in the form of an arched member 19 which is connected by a spring 20 with the butterfly 4 to which the haulage rope or cable (not shown) is secured. In this way there is obtained a self centering device.

As hereinbefore stated the racks 7 and rack wheels 8 are carried in suitable housings 17, or they might be frame members or brackets, so constructed that the guide ropes 6, of which there is one at each corner of the cage, pass through said housings 17 longitudinally thereof and the rack wheels are mounted on spindles 21 transversely mounted in said housings 17.

Mounted on each spindle 21 are rollers 22 or they might be pulley wheels, preferably grooved to correspond with the type of guide rope or cable 6 utilized and said rollers or the like 22 are mounted on said spindles eccentrically thereof and may replace the top guide pad or block, if desired.

The arrangement is such that on the breaking of the hauling rope or cable, the self centering device drops and through the action of the tension springs 12 and 15 the pivotal arms or bell cranks 11 and 16 cause the rack members 7 to rise thus rotating the rack wheels 8 and causing the eccentrically mounted rollers or the like 22 to also rotate and to come into contact with or grip the guide rope or cable 6 in proximity thereto thus bringing the cage to an immediate stoppage as soon as the haulage rope or cable breaks, as will be readily understood.

The compensating mechanism hereinbefore described in conjunction with the spring 20 interposed between the head of the cage and the butterfly 4, to which the haulage rope is secured, take the strain, so that after the repair of the haulage rope there is no sudden jerk as the cage is hauled upwards and so that the rack mechanisms hereinbefore described are in no way affected or subjected to dislocation.

When the haulage commences, the tension springs 12 and 15 act normally to keep the rack wheels 8 out of engagement with the racks 7 thus allowing the cage to travel up and down freely in the ordinary manner.

The rack mechanism, that is to say the racks 7 and the rack wheels 8 could be arranged in such manner that the pulling up of the rack member causes the rollers 22 or the like to release the guide ropes 6 instead of gripping them.

A device such as that hereinbefore described is found to act readily and give practically an instantaneous stoppage of the cage in an emergency whilst the fitting thereof is simple and comparatively cheap.

It will be understood that the details of construction of the apparatus may be modified without departing from the principle of the invention as defined by the appended claims.

I claim:—

1. Apparatus for stopping the descent of a pit cage or the like on the hauling cable breaking comprising guide ropes for the cage reciprocable rack rods carried by the cage adjacent said guide ropes, racks carried by said rack rods, rack wheels engaging said racks, spindles carrying said rack wheels, rollers eccentrically mounted on said spindles, rollers carried by the rack rods, cranked levers pivotally mounted on the cage, said levers engaging between said rollers and means moving said cranked levers lifting the rack rods rotating the rack wheels and eccentrically mounted rollers to grip the guide ropes and means for moving said cranked levers.

2. Apparatus for stopping the descent of a pit cage or the like on the hauling rope or cable breaking comprising guide ropes for the cage, reciprocable rack rods carried by the cage adjacent said guide ropes, racks carried by said rack rods, housings carried by the cage, rack wheels located in said housings, engaging said racks, the racks and guide ropes pressing through said housings, spindles carrying said rack wheels mounted in said housings, rollers eccentrically mounted on said spindles, bell crank levers pivotally mounted on the cage, said bell crank levers engaging said rack rods, compensating means connecting said bell crank levers, and means for coupling the bell crank levers of one side of the cage with the bell crank levers on the other side thereof, said eccentrically mounted rollers being rotated to grip the guide ropes.

ALFRED BUCKNALL.